United States Patent [19]
Garrett et al.

[11] Patent Number: 5,469,134
[45] Date of Patent: Nov. 21, 1995

[54] SAFETY SYSTEMS FOR ABATING THE THEFT OF VEHICLES

[76] Inventors: Ronald R. Garrett, 516 Oci Dr., Jacksonville, N.C. 28540; Dennis S. Topcik, Rte. 4 Box 238A Hwy. 20, Burton, S.C. 29902

[21] Appl. No.: 177,146

[22] Filed: Jan. 4, 1994

[51] Int. Cl.[6] ................................................ B60R 25/10
[52] U.S. Cl. .................... 340/426; 340/430; 340/528; 307/10.3; 180/271; 180/54.1
[58] Field of Search ...................... 340/459, 426, 340/432, 474, 942, 528, 429, 430, 543; 307/10.3, 10.1, 10.2; 180/271, 54.1

[56] References Cited

U.S. PATENT DOCUMENTS

| | | | |
|---|---|---|---|
| 3,914,735 | 10/1975 | Guillaiume | 340/459 |
| 4,480,249 | 10/1984 | Heidman | 340/426 |
| 4,857,888 | 8/1989 | Torres | 340/426 |
| 5,005,004 | 4/1991 | Udefot | 340/432 |
| 5,029,538 | 1/1992 | Defino et al. | 340/429 |
| 5,049,867 | 9/1991 | Stouffer | 340/531 |
| 5,061,915 | 10/1991 | Murphy | 340/426 |

OTHER PUBLICATIONS

J. C. Whitney & Co. Catalog 555J p. 61, 1993.
Engineer's Mini–note Book 1984 by Forrest M. Mims III. 1st edition 1984 Cascaded timer.

*Primary Examiner*—Brent Swarthout
*Assistant Examiner*—Nina Tong

[57] ABSTRACT

A safety system for abating the theft of vehicles comprising a door sensor switch adapted to generate a signal when the vehicle door is closed; a disarm switch adapted to be triggered by an authorized driver when the door is closed; coupling means secured with respect to the battery of a vehicle for providing power; and a control box coupled to the door sensor switch, disarm switch and battery through lines therebetween, the control box adapted to generate an alarm signal at a predetermined time after the door sensor switch determines that the door is closed and the motor is running unless the disarm switch is triggered by an authorized driver within a predetermined time following the closing of the door.

1 Claim, 2 Drawing Sheets

FIG. 1
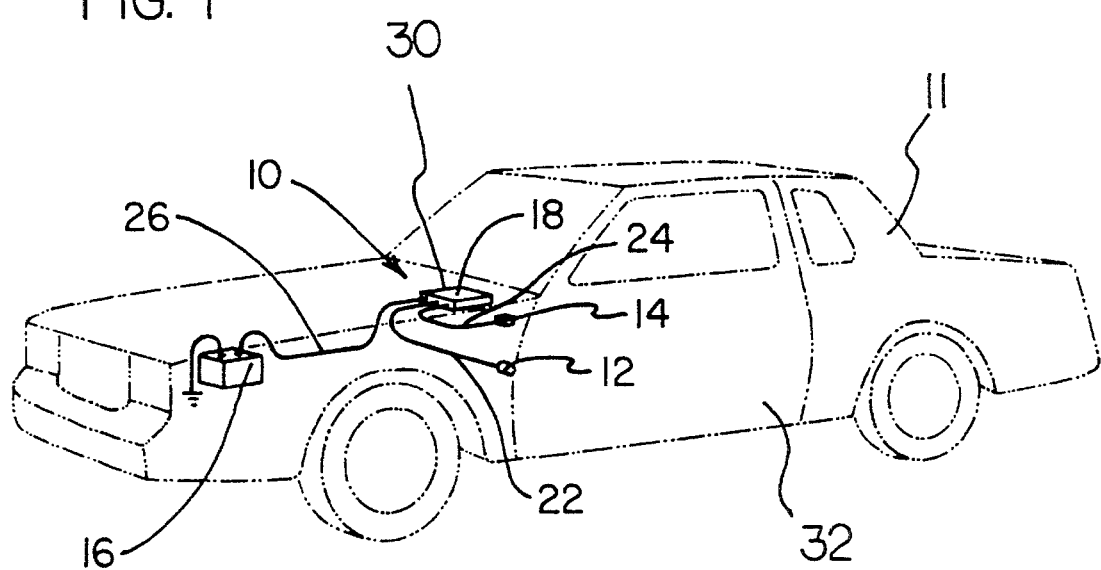
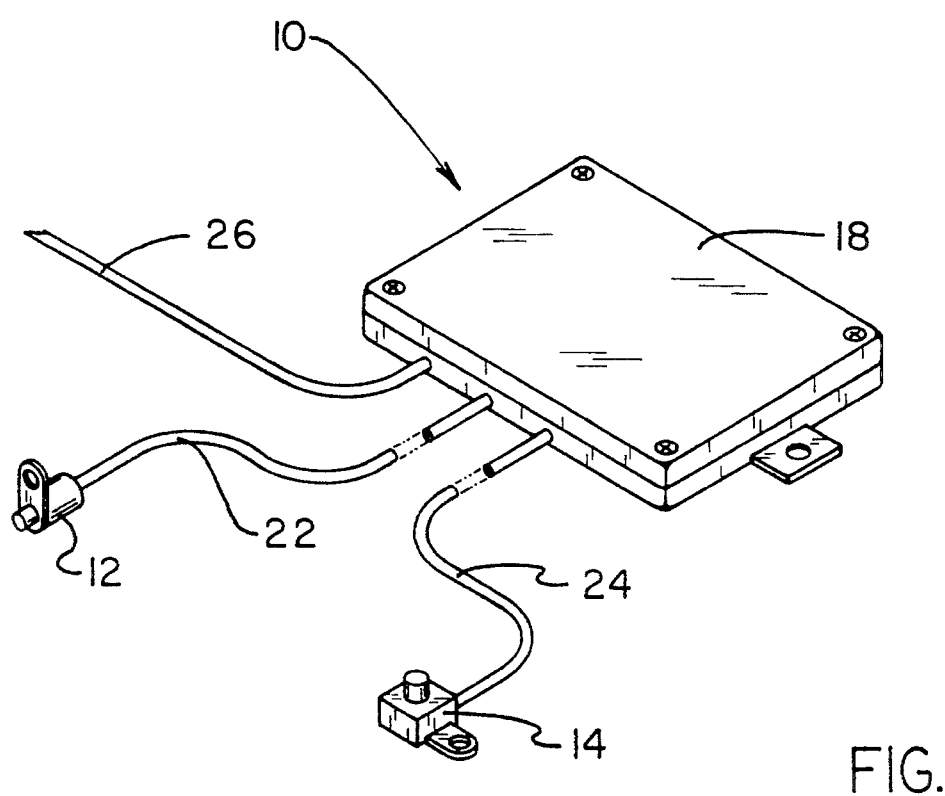
FIG. 2

SAFETY SYSTEMS FOR ABATING THE THEFT OF VEHICLES

BACKGROUND OF THE INVENTION

1. Field of the Invention

The present invention relates to safety systems for abating the theft of vehicles and more particularly pertains to abating the theft of vehicles through a system to detect unauthorized use of the vehicle and for incapacitating the vehicle and sounding an alarm in response to such unauthorized use.

2. Description of the Prior Art

The use of car safety systems is known in the prior art. More specifically, car safety systems heretofore devised and utilized for the purpose of sounding an alarm or incapacitating a vehicle during unauthorized use are known to consist basically of familiar, expected, and obvious structural configurations, notwithstanding the myriad of designs encompassed by the crowded prior art which has been developed for the fulfillment of countless objectives and requirements.

The prior art discloses a large number of car safety systems. By way of example, U.S. Pat. No. 3,914,735 to Guillaume discloses a reliable safety alarm device for automotive vehicle with engine time delay stop and starter override.

U.S. Pat. No. 4,857,888 to Torres discloses an automotive alarm.

U.S. Pat. No. 5,005,004 to Udofot discloses a light activated vehicle sensor with flashing light and pulsing sound alarm.

U.S. Pat. No. 5,061,915 to Murphy discloses an anti-theft device for motorized vehicles.

Lastly, U.S. Pat. No. 5,079,538 to DeFino discloses an automobile intruder alarm system.

In this respect, safety systems for abating the theft of vehicles according to the present invention substantially depart from the conventional concepts and designs of the prior art, and in doing so provide an apparatus primarily developed for the purpose of abating the theft of vehicles through a system to detect unauthorized use of the vehicle and for incapacitating the vehicle and sounding an alarm in response to such unauthorized use.

Therefore, it can be appreciated that there exists a continuing need for new and improved safety systems for abating the theft of vehicles which can be used for abating the theft of vehicles through a system to detect unauthorized use of the vehicle and for incapacitating the vehicle and sounding an alarm in response to such unauthorized use. In this regard, the present invention substantially fulfills this need.

SUMMARY OF THE INVENTION

In view of the foregoing disadvantages inherent in the known types of car safety systems now present in the prior art, the present invention provides improved safety systems for abating the theft of vehicles. As such, the general purpose of the present invention, which will be described subsequently in greater detail, is to provide new and improved safety systems for abating the theft of vehicles and methods which have all the advantages of the prior art and none of the disadvantages.

To attain this, the present invention essentially comprises a new and improved safety system for abating the theft of vehicles comprising, in combination, a door sensor switch adapted to generate a signal when the vehicle door is closed; a disarm switch adapted to be triggered by an authorized driver when the door is closed; coupling means secured with respect to the battery of a vehicle for providing power; a control box coupled to the door sensor switch, disarm switch and battery through lines therebetween, the control box adapted to generate an alarm signal at a predetermined time after the door sensor switch determines that the door is closed and the motor is running unless the disarm switch is triggered by an authorized driver within a predetermined time following the closing of the door; the control box including means to terminate the alarm signal at a second predetermined time after generation of the control signal.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved safety systems for abating the theft of vehicles which have all the advantages of the prior art car safety systems and none of the disadvantages.

It is another object of the present invention to provide new and improved safety systems for abating the theft of vehicles which may be easily and efficiently manufactured and marketed.

It is a further object of the present invention to provide new and improved safety systems for abating the theft of vehicles which are of a durable and reliable construction.

An even further object of the present invention is to provide new and improved safety systems for abating the theft of vehicles which are susceptible of a low cost of manufacture with regard to both materials and labor, and which accordingly are then susceptible of low prices of sale to the consuming public, thereby making such safety systems for abating the theft of vehicles economically available to the buying public.

Still yet another object of the present invention is to provide new and improved safety systems for abating the theft of vehicles which provide in the apparatuses and methods of the prior art some of the advantages thereof, while simultaneously overcoming some of the disadvantages normally associated therewith.

Even still another object of the present invention is to abate the theft of vehicles through a system to detect unauthorized use of the vehicle and for incapacitating the vehicle and sounding an alarm in response to such unauthorized use.

Lastly, it is an object of the present invention to provide a safety system for abating the theft of vehicles comprising a door sensor switch adapted to generate a signal when the vehicle door is closed; a disarm switch adapted to be triggered by an authorized driver when the door is closed; coupling means secured with respect to the battery of a vehicle for providing power; and a control box coupled to the door sensor switch, disarm switch and battery through lines therebetween, the control box adapted to generate an alarm signal at a predetermined time after the door sensor switch determines that the door is closed and the motor is running unless the disarm switch is triggered by an authorized driver within a predetermined time following the closing of the door.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is perspective illustration of the preferred embodiment of the safety system for abating the theft of vehicles constructed in accordance with the principles of the present invention.

FIG. 2 is a perspective view of the control system shown in FIG. 1 adapted for installation into a vehicle.

The same reference numerals refer to the same parts throughout the various Figures.

DESCRIPTION OF THE PREFERRED EMBODIMENT

Figure 3:
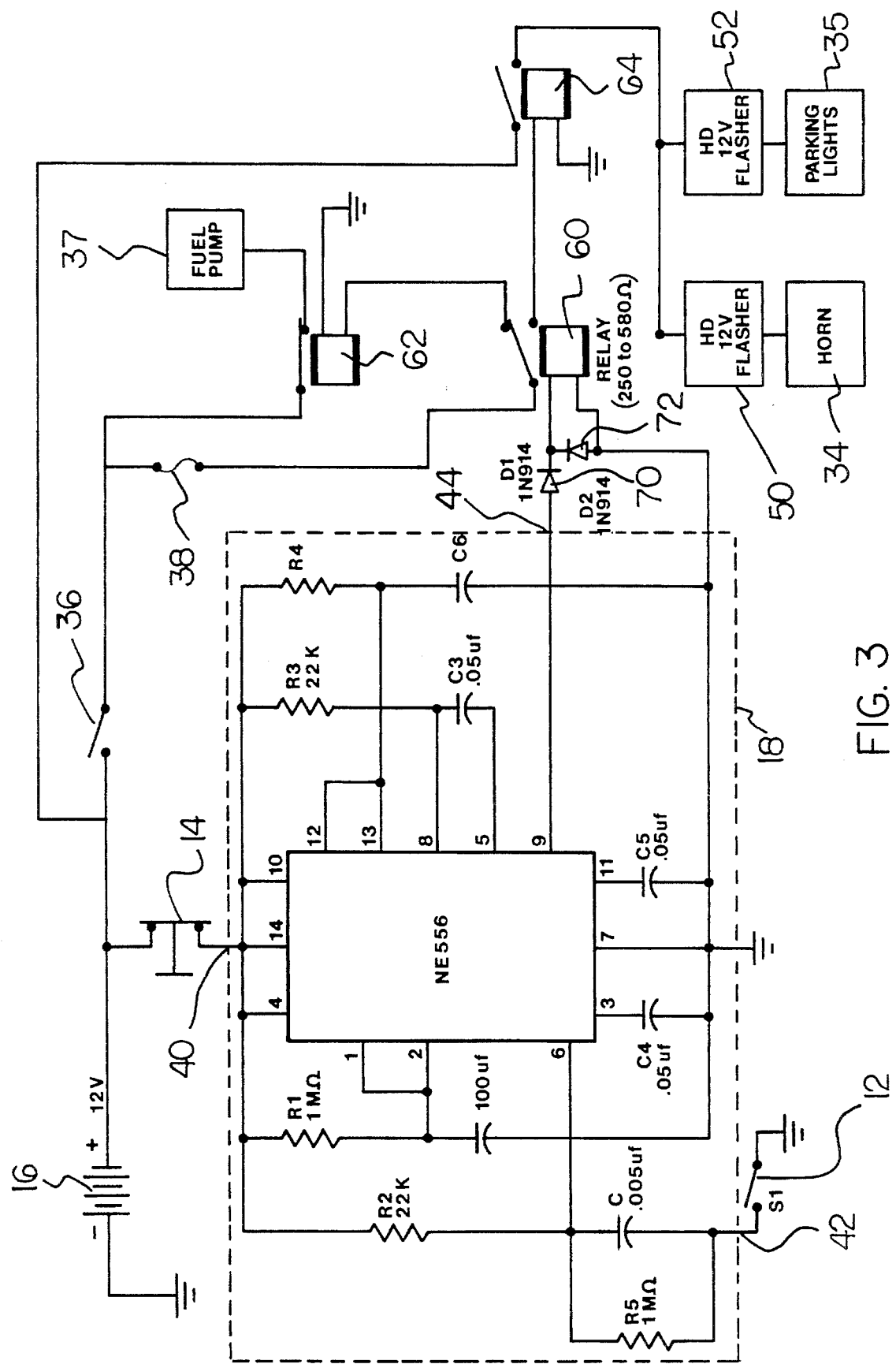
FIG. 3 is an electrical schematic of the control logic for the system of the prior Figure.

With reference now to the drawings, and in particular to FIGS. 1 through 3 thereof, the preferred embodiment of the new and improved safety system for abating the theft of a vehicle embodying the principles and concepts of the present invention and generally designated by the reference numeral 10 will be described.

Specifically, it will be noted that the present invention is a new and improved safety system 10 for abating the theft of a vehicle. In its broadest context, the system 10 includes four major components. Such major components are the door sensor switch 12, a disarm switch 14, a battery 16, and a control box 18. These components are coupled one with respect to the other to achieve the intended objects and advantages.

More specifically, the door sensor switch 12 is a component located in the vehicle adjacent to the door on the driver's side. The door sensor switch is normally closed but is adapted to be opened and reclosed to generate a signal whenever the vehicle door is closed.

In association therewith is a disarm switch 14. The disarm switch is located adjacent to the dashboard of the vehicle. It is adapted to be triggered by a driver, preferably an authorized driver, whenever the door on the driver's side is opened then closed.

The third component of the system is the battery 16. The battery is a conventional battery found in vehicles for powering vehicles. The battery 16, in the present situation, also provides power to the system 10 of the present invention.

The fourth and major component of the system is the control box 18. The control box 18 is coupled to the door sensor switch 12 through lines 22. It is also coupled to the disarm switch 14 through lines 24. Lastly, it is coupled to the battery 16 through lines 26.

The control box is adapted to identify a set of circumstances associated with the vehicle and above-referred to switches and is adapted to generate an alarm signal at a predetermined time after the door sensor switch determines that the door has been closed and the motor is running. Such alarm signal will be generated unless the disarm switch 14 is triggered by the driver, preferably an authorized user of the vehicle. Such triggering of the disarm switch to be effective must be done within a predetermined time following the occurrence of the two events, the closing of the door and the powering of the vehicle.

The control box 18 is also pre-programmed to terminate the alarm signal at a predetermined second time lapse after the generation of the control signal.

The details of the control system are shown in FIG. 1 and FIG. 3. Such components are conventional within the electronic parts and can be readily understood in association with the functions being performed with the functions being described herein.

The present invention is mounted in a vehicle 11. As shown in FIG. 1, the vehicle has a dashboard 30 and a closeable driver's side door 32. Furthermore, as shown in FIG. 3, the vehicle has a horn 34, parking lights 35, a single pole single throw switch 36 with a first terminal and a second terminal, an electric fuel pump 37, a fuse 38 coupled to the first terminal of the single pole single throw switch 36, and an electric battery 16 with a positive terminal and a grounded negative terminal.

The openable door sensor switch 12 is coupled to the vehicle 11 at a location near the door 32 thereof as shown in FIGS. 1 and 3. The door sensor switch has a first terminal and a grounded second terminal. The door sensor switch generates a control signal at the first terminal thereof when the door of the vehicle is closed. The disarm switch 14 has a first terminal and a second terminal. The second terminal of the disarm switch 14 is coupled to the positive terminal of the battery. The disarm switch is further coupled to the dashboard 30 of the vehicle 11 as shown in FIG. 1. The disarm switch is triggerable by an authorized driver when the door of the vehicle is closed.

As best illustrated in FIG. 3, the electrically energizable control box 18 has a first input terminal 40, a second input terminal 42, and an output terminal 44. The first input terminal 40 is coupled to the first terminal of the disarm switch 14 for receiving electrical power from the battery 16. The second input terminal 42 is coupled to the first terminal of the door sensor switch 12 for receiving the actuation signal therefrom. The output terminal 44 transmits an alarm signal beginning three minutes after receiving the control signal, unless the disarm switch 14 is triggered by the authorized driver within three minutes of receiving the control signal. The control box 18 further automatically terminates transmission of the alarm signal from the output terminal 44 at three minutes after the beginning of alarm signal transmission.

In addition, the vehicle 11 includes an electrically-energizable first flasher mechanism 50 coupled to the horn 34 of the vehicle. The flasher mechanism 50 allows the horn to be blasted when electrically energized. An electrically energizable second flasher mechanism 52 is also included and coupled to the parking lights 52 of the vehicle. The flasher mechanism 52 allows the parking lights 36 to be flashed when electrically energized.

Furthermore, the present invention includes a single pole double throw relay 60, a normally closed first single pole single throw relay 62, and a normally open second single pole single throw relay 64. The first single pole single throw relay 62 is coupled to the first terminal of the single pole single throw switch 36 and the fuel pump 37 and the negative terminal of the battery 16. The second single pole single throw relay 64 is coupled to the second terminal of the single pole single throw switch 36 and the negative terminal of the battery 16 and the first and the second flasher means 50, 52. The single pole double throw relay 60 is coupled to the first single pole single throw relay 62 and the second single pole single throw relay 64 and the fuse 38. The relays 60, 62, 64 have an activated mode of operation for allowing the flasher mechanisms 50, 52 to be energized and for preventing the fuel pump 37 from being activated upon receipt of the alarm signal at the single pole single throw relay 60. The relays also have another activated mode of operation for preventing the flasher mechanisms 50, 52 from being energized and for allowing the fuel pump to be deactivated upon termination of transmission of the alarm signal at the single pole single throw relay 60. The relays further have a deactivated mode of operation when the single pole single throw switch 36 is opened.

Lastly, a first diode 70 and a second diode 72 are provided. Each diode has a positive terminal and a negative terminal. The negative terminal of the first diode 70 coupled to the output terminal 44 of the control box and the positive terminal thereof is coupled to the single pole double throw relay 60. The positive terminal of the second diode 72 is coupled to the positive terminal of the first diode 70 and the negative terminal thereof coupled to the negative terminal of the battery 16 and the single pole double throw relay 60. The diodes 70, 72 are operable for preventing inadvertent energization of the flasher mechanisms 50, 52 and inadvertent deactivation of the fuel pump.

The present invention is a combination anti-theft and anti-carjacking device. Its advantages are that it is relatively inexpensive yet extremely effective, while also providing a valuable margin of safety for the carjacking victim. With this product, there is also a high probability that the victim will be able to retrieve the vehicle quickly.

The present invention features a safety switch that is wired to the driver's door, horn, parking lights and fuel pump. The switch is within easy reach of the driver, but is hidden out of sight so that it would be difficult for a stranger to detect. Upon entering the vehicle, the driver must push this switch or the present invention will turn off the circuit for the vehicle's fuel pump after three minutes. A thief, who would obviously not think to push the switch, would quickly find himself in a completely disabled car. Since no thief could get very far in three minutes, the vehicle would undoubtedly be somewhere close to where the owner had it parked originally. After a total of six minutes, the device automatically resets.

Carjacking is a slightly different matter. This is a case where a thief forces the driver of an already-running car to leave the vehicle, and the thief then steals the car. The present invention deals with this situation in the following way: If, after the engine is started and the safety switch is pushed, the driver's door is opened, as it would during a carjacking, the three-minute timer in the present invention is again activated.

At the end of three minutes in this scenario, not only does the fuel pump shut down, but the horn begins blasting and the parking lights start flashing, drawing immediate attention to the vehicle. Once again, the result is a completely disabled vehicle. The carjacker will undoubtedly leave the scene quickly under these circumstances. Importantly, the three-minute margin of time will likely result in the vehicle breaking down on the carjacker when the victim is left behind at a safe distance.

The present invention is made from readily available components and materials. It is cleverly designed so that it may be installed relatively easily. It is anticipated that many purchasers will be able to install the unit themselves. The present invention incorporates very useful features that should appeal to many security-conscious drivers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved safety system for abating the theft of vehicles comprising, in combination:

a vehicle having a dashboard, a closeable driver's side door, a horn, a plurality of parking lights, a single pole single throw switch with a first terminal and a second terminal, an electric fuel pump, a fuse coupled to the first terminal of the single pole single throw switch, and an electric battery with a positive terminal and a grounded negative terminal;

a door sensor switch coupled to the vehicle at a location near the door thereof, the door sensor switch having a first terminal and a grounded second terminal and with the door sensor switch generating a control signal at the first terminal thereof when the door of the vehicle is closed;

a disarm switch having a first terminal and a second terminal and with the second terminal coupled to the positive terminal of the battery, the disarm switch further coupled to the dashboard of the vehicle, the disarm switch triggerable by an authorized driver when the vehicle door is closed;

an electrically energizable control box having a first input terminal, a second input terminal, and an output terminal, the first input terminal coupled to the first terminal of the disarm switch for receiving electrical power from the battery, the second input terminal coupled to the first terminal of the door sensor switch for receiving the control signal therefrom, and with the output terminal transmitting an alarm signal beginning three minutes after receiving the control signal, unless the disarm switch is triggered by the authorized driver within about three minutes following closing of the vehicle door, and with the control box further automatically terminating transmission of the alarm signal from the output terminal thereof at three minutes after the beginning of alarm signal transmission;

flasher means secured with respect to the horn of the vehicle and parking lights of the vehicle blasting the horn and flashing the parking lights when activated; and a single pole double throw relay, a normally closed first single pole single throw relay, and a normally open second single pole single throw relay with the first single pole single throw relay coupled to first terminal of the single pole single throw switch and the fuel pump and the negative terminal of the battery, the second single pole single throw relay coupled to the second terminal of the single pole single throw switch and the negative terminal of the battery and the flasher means, and the single pole double throw relay coupled to the first single pole single throw relay and the second single pole single throw relay and the fuse, the relays having an activated mode of operation for allowing the flasher means to be energized and for preventing the fuel pump from being activated upon receipt of the alarm signal at the single pole single throw relay, the relays having another activated mode of operation for preventing the flasher means from being energized and for allowing the fuel pump to be deactivated of upon termination of transmission of the alarm signal at the single pole single throw relay, and the relays further having a deactivated mode of operation when the pole single throw switch is opened; and a first diode and a second diode, each diode having a negative terminal and a negative terminal, with the positive terminal of the first diode coupled to the output terminal of the control box and the positive terminal thereof coupled to the single pole double throw relay and with the positive terminal of the second diode coupled to the positive terminal of the first diode and the negative terminal thereof coupled to the negative terminal of the battery, and with the diodes operable for preventing inadvertent energization of the flasher means and deactivation of the fuel pump.

* * * * *